US008480404B2

(12) United States Patent
Savitsky

(10) Patent No.: US 8,480,404 B2
(45) Date of Patent: Jul. 9, 2013

(54) MULTIMODAL ULTRASOUND TRAINING SYSTEM

(76) Inventor: Eric A. Savitsky, Malibu, CA (US)

( * ) Notice: Subject to any disclaimer, the term of this patent is extended or adjusted under 35 U.S.C. 154(b) by 2 days.

(21) Appl. No.: 13/243,758

(22) Filed: Sep. 23, 2011

(65) Prior Publication Data

US 2012/0058457 A1 Mar. 8, 2012

Related U.S. Application Data

(63) Continuation of application No. 11/720,515, filed as application No. PCT/US2005/043155 on Nov. 30, 2005, now abandoned.

(60) Provisional application No. 60/631,488, filed on Nov. 30, 2004.

(51) Int. Cl.
*G09B 23/28* (2006.01)
*G06G 7/48* (2006.01)

(52) U.S. Cl.
USPC ............ 434/262; 434/267; 434/322; 703/3; 703/11; 600/416; 600/437; 600/441

(58) Field of Classification Search
USPC .............. 434/262, 267, 274, 322; 703/1, 3, 703/11; 600/437, 441, 416, 440, 458; 382/128, 382/276, 283
See application file for complete search history.

(56) References Cited

U.S. PATENT DOCUMENTS

| | | | | |
|---|---|---|---|---|
| 5,609,485 | A | * | 3/1997 | Bergman et al. ............. 434/262 |
| 5,701,900 | A | * | 12/1997 | Shehada et al. ............. 600/463 |
| 5,767,839 | A | * | 6/1998 | Rosenberg ................... 345/161 |
| 6,074,213 | A | * | 6/2000 | Hon ............................. 434/262 |
| 6,113,395 | A | * | 9/2000 | Hon ............................. 434/262 |
| 6,516,213 | B1 | * | 2/2003 | Nevo ............................ 600/424 |
| 7,037,258 | B2 | * | 5/2006 | Chatenever et al. .......... 600/109 |
| 7,371,068 | B2 | * | 5/2008 | Lloyd et al. .................. 434/262 |
| 7,794,388 | B2 | * | 9/2010 | Draxinger et al. ........... 600/101 |
| 7,857,626 | B2 | * | 12/2010 | Toly ............................. 434/267 |
| 2001/0031920 | A1 | * | 10/2001 | Kaufman et al. ............. 600/431 |
| 2002/0168618 | A1 | * | 11/2002 | Anderson et al. ............ 434/262 |
| 2004/0043368 | A1 | * | 3/2004 | Hsieh et al. .................. 434/262 |
| 2005/0181342 | A1 | * | 8/2005 | Toly ............................. 434/262 |
| 2005/0283075 | A1 | * | 12/2005 | Ma et al. ...................... 600/441 |

* cited by examiner

*Primary Examiner* — Kang Hu
(74) *Attorney, Agent, or Firm* — Cisio & Thomas, LLP

(57) ABSTRACT

The present invention teaches a medical procedure training system based on a PC platform that provides multimodal education within a virtual environment. The system integrates digital video, three-dimensional modeling, and force-feedback devices for the purpose of training medical professionals medical procedures.

19 Claims, 8 Drawing Sheets

MULTIMODAL ULTRASOUND TRAINING SYSTEM

CROSS-REFERENCES TO RELATED APPLICATIONS

This patent application is a continuation and claims the benefit of U.S. patent application Ser. No. 11/720,515 filed May 30, 2007 for Multimodal Medical Procedure Training System, which is the national stage entry of PCT/US05/43155, entitled "Multimodal Medical Procedure Training System" and filed Nov. 30, 2005 now abandoned, which claims priority to U.S. Provisional Patent Application No. 60/631,488, entitled "Multimodal Emergency Medical Procedural Training Platform" and filed Nov. 30, 2004. Each of those applications is incorporated here by this reference.

TECHNICAL FIELD

This invention relates generally to systems and methods for providing medical training, and more specifically to medical training systems and methods that at least partly involve simulations of medical procedures and operations.

BACKGROUND ART

Today, medical educators are under considerable societal pressure and budgetary constraints to enhance the quality of medical education. Traditional "learning by doing" models have become less acceptable, particularly where invasive procedures and high-risk care are required.

Traditionally, medical education and procedural training have been delivered via live lectures, text-based learning, bedside teaching, and patient simulation models (e.g., cadavers or electronic patient simulators). Bedside teaching has been widely acclaimed as one of the most effective medical teaching techniques. Bedside procedural training often follows the traditional "see one, do one, teach one" philosophy. However, while such medical training provides trainees with valuable "hands-on" experience, this type of training by its nature requires that care providers without prior procedural training develop their skills by performing procedures for the first time on actual patients. Given that many medical procedures not only are challenging to perform, but also, if performed improperly, can pose significant risks to patient health and safety, such conventional "see one, do one, teach one" training is not always a preferred method of training.

One exemplary medical procedure for which traditional "see one, do one, teach one" training is not always favored is subclavian central venous line (CVL) placement. CVL placement is a commonly performed intervention in critically ill patients having limited peripheral venous access. Complications of this procedure can potentially include misplacement of the line, a collapsed lung or hemorrhage, and statistics show that such complications can occur in between 4 to 15 percent of patients having this procedure. It is commonly regarded that there is a direct link between the complications associated with CVL placement and the number of lines previously placed by the medical professional. Thus, while it is desirable that medical professionals performing CVL placements be highly experienced in performing the technique, it is not particularly desirable that medical professionals develop their experience by performing the procedure on actual patients.

For these reasons, medical professionals are increasingly being taught by way of alternative training methodologies. Such alternative training methodologies include web-based education, high-fidelity human patient simulation and virtual reality (VR). VR training methodologies in particular are advantageous for several reasons. VR enables humans to directly interact with computers in computer-generated environments that simulate our physical world. VR systems vary in their level of realism and their level of user immersion into the real world. VR enables students to study and learn from virtual scenarios in a manner that does not involve any risk to patients or involve the depletion of resources that might otherwise be reused. However, VR systems are often costly items prohibiting wide scale use in the medical training arena.

Although advantageous in many respects, conventional VR training methodologies are still lacking in certain regards. To begin with, conventional VR training methodologies have not integrated multiple simulated conventional medical technologies along with textbook style learning. VR systems have not integrated motion sensor technology interconnected with digital video, 3-D modeling, and force-feedback devices based on a single PC platform and cost effective for widespread use. Conventional VR training methodologies are often cost prohibitive for use by entities with many students or trainees. High costs have prevented the widespread use of VR technologies for medical education and training.

In view of these inadequacies of conventional VR training methodologies, it would be advantageous if a new, improved system and/or method of VR training was developed. In at least some embodiments, it would be advantageous if such improved VR training system/method were capable of integrating emerging technologies along with more traditional methods of medical learning such as "see one, do one, teach one" training. Also, in at least some embodiments, it would be advantageous if such improved VR training system/method was capable of integrating emerging technologies with conventional medical sensing, testing, and/or imaging devices. Further, in at least some embodiments, it would be advantageous if such improved VR training system/method were PC-based and cost effective.

DISCLOSURE OF INVENTION

The present inventor has recognized the need to provide an improved VR system and method for providing medical training. In particular, the present inventor has recognized that it would be particularly advantageous to provide a multimodal VR medical training system providing not only VR anatomical images, but also one or more of (a) simulations of images that might be obtained using actual imaging devices (e.g., ultrasound, CT, or MRI imaging systems), and (b) simulations of physical forces or other physical conditions that might be experienced by a physician (or other medical personnel) while performing a procedure.

Accordingly, the present invention is a medical procedure training system which includes a control device, and a graphical interface connected to the control device providing a plurality of interface sections. A first interface section displays a digital video and a second interface section displays a three-dimensional anatomical model. The system includes a user input device connected to the control device. At least one of the 3-D anatomical model and digital video displayed by the graphical interface varies at least indirectly in dependence upon signals provided by the user input device. The system is configured to at least partially simulate medical procedures through a system feedback.

Another aspect of the present invention provides a platform for simulating medical procedures selected from the group consisting of Anoscopy, central line placement, cricothyrodotomy, Anterior and Posterior Nasal packing, arterial cannulation, arterial blood gas, arthrocentesis, bladder catheterization, cardiac massage, cardiac massage, cardiac placing/cardioversion, contrast injection for imaging, endotracheal intubation, foreign body removal from cornea, fracture reduction, incision and drainage of abscess, intraosseous line placement, local anesthesia, lumbar puncture, nail trephination, needle thoracotomy, nerve blocks, nasogastric tube placement, percutaneous transtracheal ventilation, pericardiocentesis, peripheral intravenous line placement, thoracentesis, tube thoracotomy, and venous cutdown.

Another aspect of the present invention includes a method for operating a multimodal medical training system which includes selecting a simulated procedure and displaying corresponding images on a graphical interface. Input is received by the system from a first and second user input device. The images are modified and correspond to the input received and output signals of the force-feedback device.

BEST MODE FOR CARRYING OUT THE INVENTION

Figure 1:
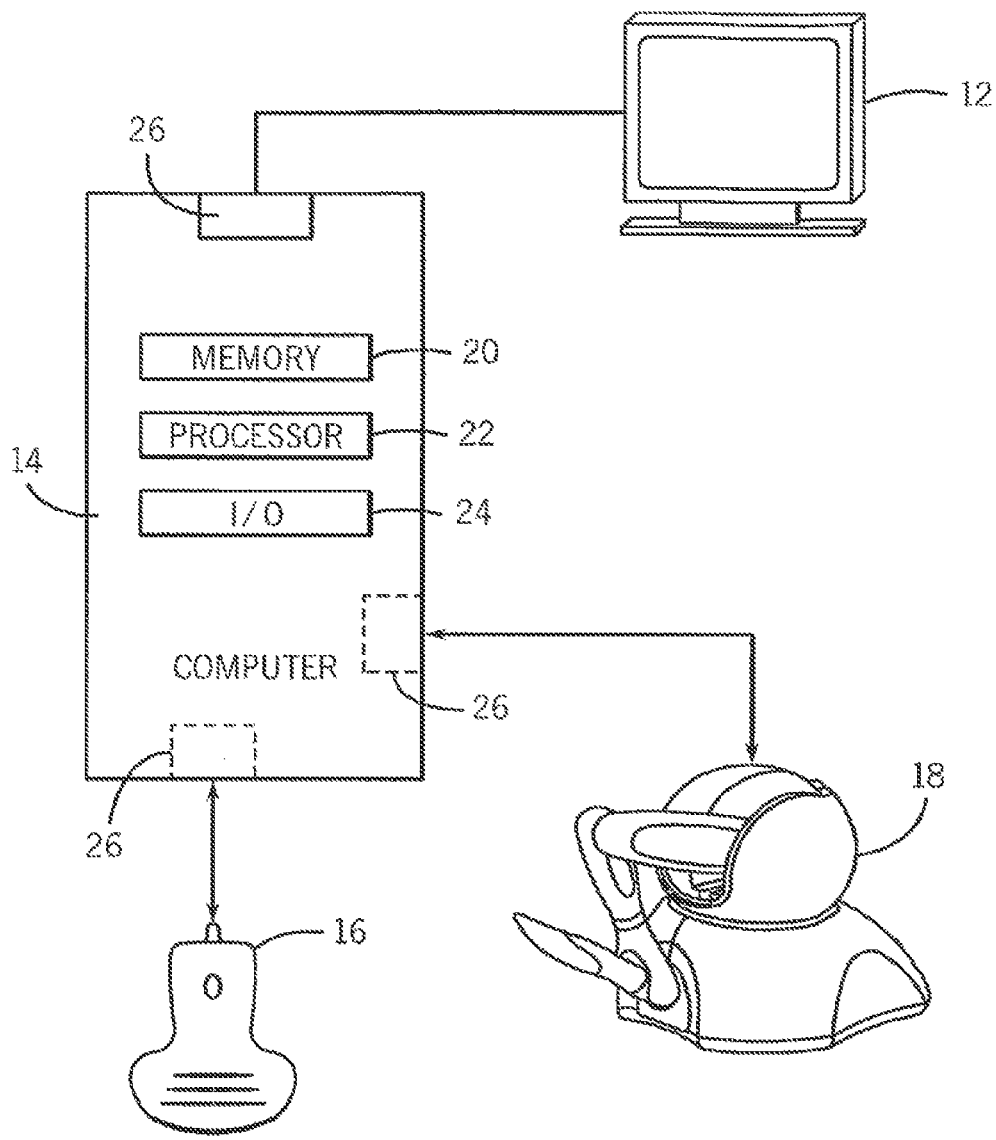
FIG. 1 is a schematic block diagram of exemplary components of a medical procedure training system in accordance with at least some embodiments of the present invention.

Referring to FIG. 1, a first exemplary embodiment of an improved medical training system 10 is shown to include a graphical interface 12, a computer 14, a first input/output device 16 and a second input/output device 18. Also as shown, the computer 14 includes a memory device 20, a processor 22, and an input/output device 24. Each of the graphical interface 12, the first input/output device 16, and the second input/output device 18 is connected to the computer 14 by way of conventional connection devices. In the present embodiment, for example, the computer 14 has optional serial ports 26 that serve as interfaces between the computer 12 and each of the graphical interface 12 and the devices 16 and 18. Depending upon the embodiment, the serial ports 26 and other connection component(s) could include any of a variety of different components/devices (e.g., networking components) including, for example, an Ethernet port/link, an RS232 port/communication link, or wireless communication devices. The medical training system 10 is a platform for simulating medical procedures, including the integration of one or more devices 16, 18 that simulate medical tools.

The computer 14 can be a desktop or laptop personal computer (PC), and can be of conventional design. For example, the computer 14 could be an "Intel" type computer and employ a version of Microsoft Windows® available from Microsoft Corporation of Redmond, Wash., and a Pentium® microprocessor available from Intel Corporation of Santa Clara, Calif. In at least some embodiments, the graphical interface 12 associated with the computer 14 would have special display capabilities, for example, 3D display capabilities. For example, the computer 14 could be a Sharp Actius® RD3D PC having a stereoscopic LCD screen capable of both 2D and 3D display modes.

The processor 22 of the computer 14 (which, as noted above, could be a microprocessor) governs the operation of the computer in terms of its internal operations as well as its interaction with the external devices 16, 18 and the graphical interface 12. More particularly, the computer governs the accessing of the memory 20, on which is stored various software programs and other data, and the interaction of the computer 14 with the devices 16, 18 and graphical interface 12 by way of the I/O 24. The memory device 20 stores the programs and processes that enable the system 10 to react to user input.

Figure 2:
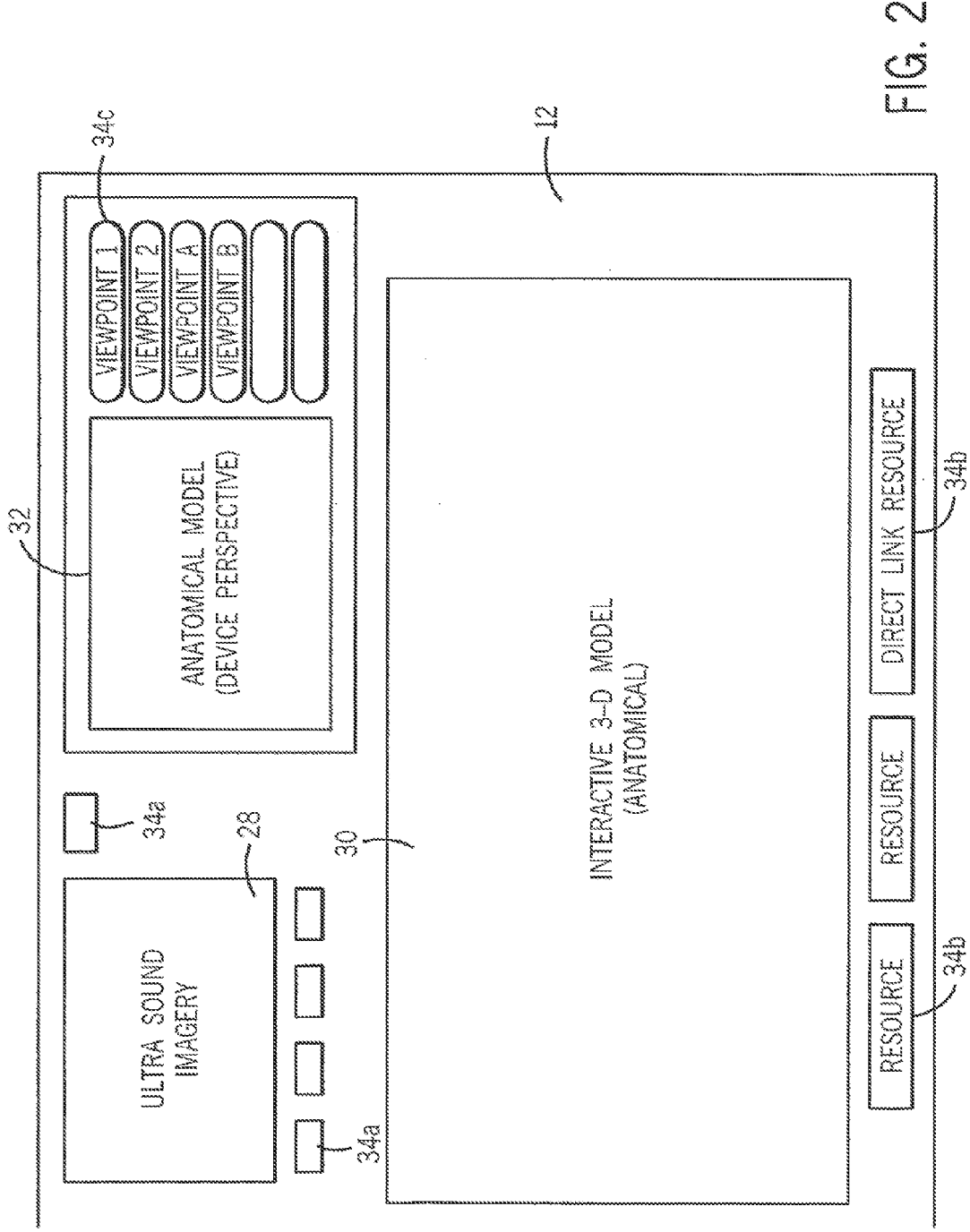
FIG. 2 an exemplary screen shot of a graphical interface that could be provided by the medical procedure training system of FIG. 1.

Turning to FIG. 2, a front view of an exemplary screen shot of the graphical interface 12 is depicted. In the exemplary screen shot shown, the graphical interface 12 has three sections or windows, namely, a video display section 28, an interactive 3-D modeling section 30, and a device perspective anatomical section 32. The perspective anatomical section 32 typically provides a high-level (potentially 3-D) view of a body or body portion. The interactive 3-D modeling section 30 typically provides a more detailed view of the body or body portion shown in the perspective anatomical section 32 (or another body portion). Further, the video display section 28 is capable of displaying images that simulate actual images that might be obtained during an actual procedure involving the body or body portion shown in the interactive 3-D modeling section. Although the present embodiment shows the graphical interface 12 as having three sections 28, 30 and 32, in alternate embodiments only two of the sections, or possibly more than three sections, would be provided. In particular, the present invention is intended to encompass embodiments having a first window showing 3-D anatomical features and a second window showing images that simulate actual images that might be obtained during an actual procedure (e.g., the type of images shown in section 28).

Additionally, the interface 12 has a plurality of tabs 34a, 34b and 34c associated with the sections 28, 30 and 32, respectively. As shown, the tabs 34a associated with the section 28 are selectable (e.g., by pointing to one of the tabs using a mouse and then selecting the tab by clicking on it) for accessing a variety of image resources. In the present example, a first (e.g., leftmost) one of the tabs 34a has been selected, causing the video display section 28 to display ultrasound imagery. If others of the tabs 34a were selected, other types of image information could be provided in the video display section 28, such as MRI image information or CT image information. Further as shown, the tabs 34b also allow an operator to access different informational resources, such as textual and/or traditional based medical training resources. In some embodiments, these tabs 34b could be links to relevant web pages. Additionally as shown, the tabs 34c are selectable for altering a viewpoint of the anatomical model image being provided within the section 30.

The force-feedback device 18 is a haptic interface that exerts an output force reflecting input force and position information obtained from the user. The present embodiment (See FIG. 1) provides a force-feedback device 18 having a shape similar to that of a syringe. The device 18 has a six degree range of motion that provides for a simulated medical device. An exemplary example of the force-feedback device is a Phantom Omni® commercially produced by SensAble Technologies, Inc. based in Woburn, Mass. The exemplary device has a support stand, actuation means, pivot arm, and stylus.

Figure 3:
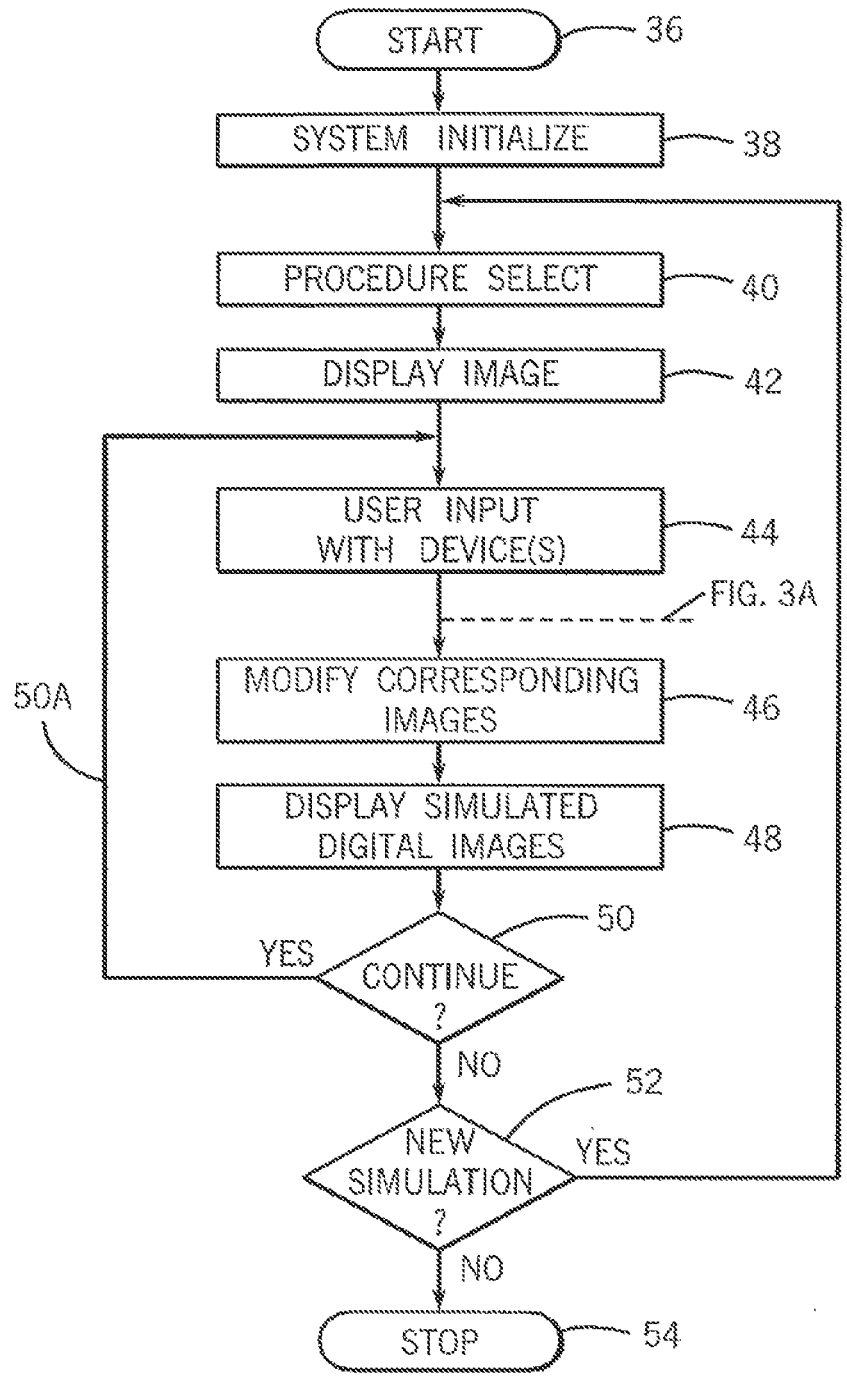
FIG. 3 is flow chart showing exemplary steps of operation that could be performed by the medical procedure training system of FIG. 1.

Turning to FIG. 3, exemplary steps for operation of the medical training system 10 are shown. Upon commencing operation at a step 36, the system 10 is initialized at a step 38, or in the case of a PC, an operating system (not shown) performs a booting procedure and identifies any connected I/O devices. Next, at a step 40, the user selects a particular procedure corresponding to a medical procedure the user would like to be trained/educated. The processor 22 performs various functions, such that the system 10 provides output to the graphical interface 12 such that the corresponding images for the selected procedure are displayed by the graphical interface, at a step 42.

Next, at a step 44, an input/output device 16 is engaged by the user so as to provide input signals at step 44 to the computer 14. Images displayed by the graphical interface 12 are modified at step 46 in a manner that corresponds with the input at step 44 of the device 16. The modified images are then displayed at step 48 by the interface 12. At this point the user determines whether he or she would like to continue at step 50 providing input to the device 16 for the same procedure by returning to step 44, or would like to end the simulated procedure and begin a new simulated procedure at step 52. The point at which the user decides to continue at step 50 represents the end of a loop 50A in the system operation that begins by input at step 44 from the user. If neither option is selected the system 10 will continue until it receives a command to stop at step 54.

Figure 3A:
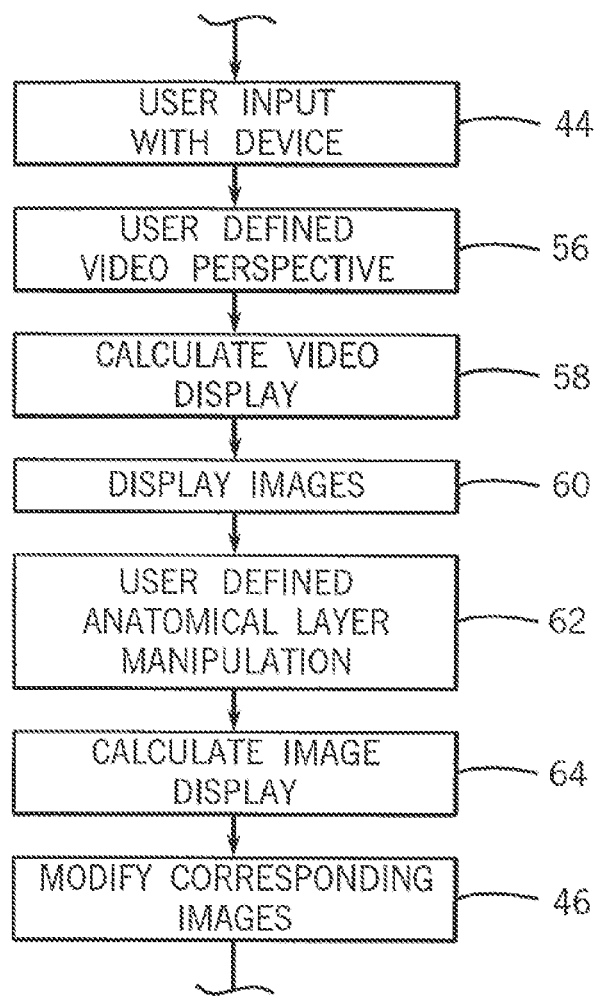
FIG. 3A is a flow chart showing additional exemplary steps of operation that could be performed by the medical procedure training system of FIG. 1.

FIG. 3A illustrates in further detail exemplary steps that can be performed within the loop 50A as to the operation of the system 10. Subsequent to user input at step 44 the user can define the perspective at step 56 of the anatomical images displayed by the interface 12 (e.g., by way of selecting one of the tabs 34c of FIG. 2). A perspective can be selected from among a finite number of predetermined locations or, alternatively, a device perspective can be dynamically selected. The processor 22 calculates the display at step 58 dependent upon the perspective chosen at step 56. Images are displayed at step 60 that correspond to the perspective and device input at step 44. The user then selects at step 62 a layer manipulation of the three-dimensional model, which can include maintaining a default layer manipulation. Selection at step 62 of the layer manipulation allows the user to view various abstractions of the three-dimensional model while navigating the device 16. The system 10 calculates at step 64 the images to be displayed by the interface 12 based upon the layer abstraction. Images are modified at step 44 according to the calculations.

Figure 4:
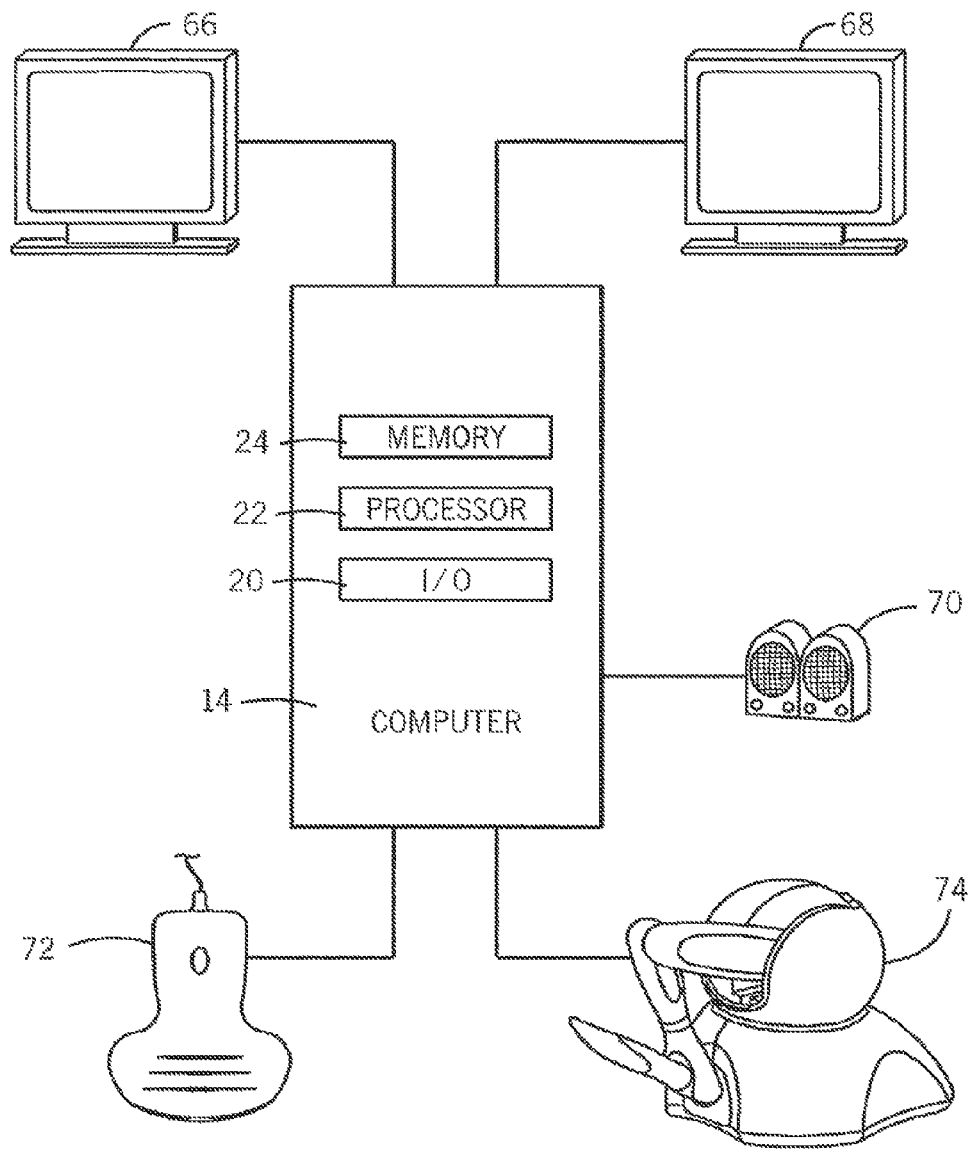
FIG. 4 is a schematic block diagram of exemplary components of another medical procedure training system in accordance with at least some embodiments of the present invention, where the system is a dual interface system.

Now referring to FIG. 4, an alternative embodiment of the system 110 is shown. The system 110 has a first graphical interface 66, a second graphical interface 68, a computer 14, speakers 70, a first device 72, and a second device 74. The first interface 66 displays images corresponding to the first device 72, while the second interface 66 displays images corresponding to the second device 74. Dynamic images are displayed by the interfaces 66, 68 corresponding to each of the devices as the user navigates through a training procedure. The dual interface embodiment 110 provides a means for simultaneously displaying an ultrasonographic simulation and a three-dimensional model having an anatomical landmark simulation, while providing separate interfaces as would be the case in a real-life situation. The dual input, or bimanual, system 110 allows the user to obtain real-time ultrasound imagery of a vital biological structure with one hand and navigate the three-dimensional virtual environment with the other.

In one embodiment of the system 110, device 72 is an ultrasound probe having an integrated motion sensor. The device 72 can be a commercially available ultrasound probe with a motion sensor integrated within, which allows for greater consistency to real-life applications. A set of images is displayed by graphical interface 66 corresponding to the spatial orientation of the simulated probe 72 and in relation to a three-dimensional model. The simulated probe 72 can provide haptic feedback to the user. In alternative embodiments, device 72 can include a hand-tracking motion sensor that can be used to simulate a variety of medical procedures. By example, the procedures can include probing a wound, palpating a anatomical structure, application of pressure to a 3-D biological system model, inserting an object into the 3-D biological system model, and stabilizing a structure in the 3-D biological system model. Device 74 is a force-feedback device that can be utilized to simulate a needle-based or blunt-tipped instrument based procedure. Tracking of the device 74 is calculated by the system 110 and then displayed by the graphical interface 68. By example, simulated instruments 74 can include a needle and syringe, central venous catheter, Foley catheter, nasogastric tube, pericardiocentesis needle, thoracentesis needle, and surgical scalpel.

In an alternative embodiment of the system 110, more than one user may interactively perform a simulated medical procedure. Devices 72, 74 can be duplicative such that more than a single user may utilize the same devices of the system. The graphical interfaces 66, 68 can be the same for each user of the system 110. Often multiple medical professionals are necessary to complete a given medical procedure. This embodiment of the system 110 allows for more than one user to interactively perform a medical procedure with other users, simulating a real world multiple user medical procedure. The devices 72, 74 can be a combination of those disclosed in the previous embodiments and need not be the same set for each user. Additionally, the system 110 can simulate the relationship between primary and secondary medical professional interaction with the 3-D biological system model.

The input/output management device 24 of the computer 14 manages the interfaces (not shown) between the computer 14 and the peripheral devices 66, 68, 70, 72, 74. Audio instructions and guidance can be provided by the system 10. Audio data is accessed from memory 20 and sent to the speakers 70 by the processor 22. Audio instructions can also be computer-generated based upon certain criteria of the procedure and procedure completion. Audio instruction can be in the form of a prerecorded continuous string that spans substantially the entire length of the procedure. Alternatively, the audio instruction can include prerecorded segments that are triggered by timeline landmarks in the procedure. Alternatively, the audio data can include sounds that correspond to real-life scenarios associated with the procedure being performed. By example, if the procedure chosen by the user is CVL placement, as the simulated syringe collides with the simulated person, a human oriented auditory response can be generated, which can indicate to the user that a greater amount of anesthetic is needed.

Figure 5:
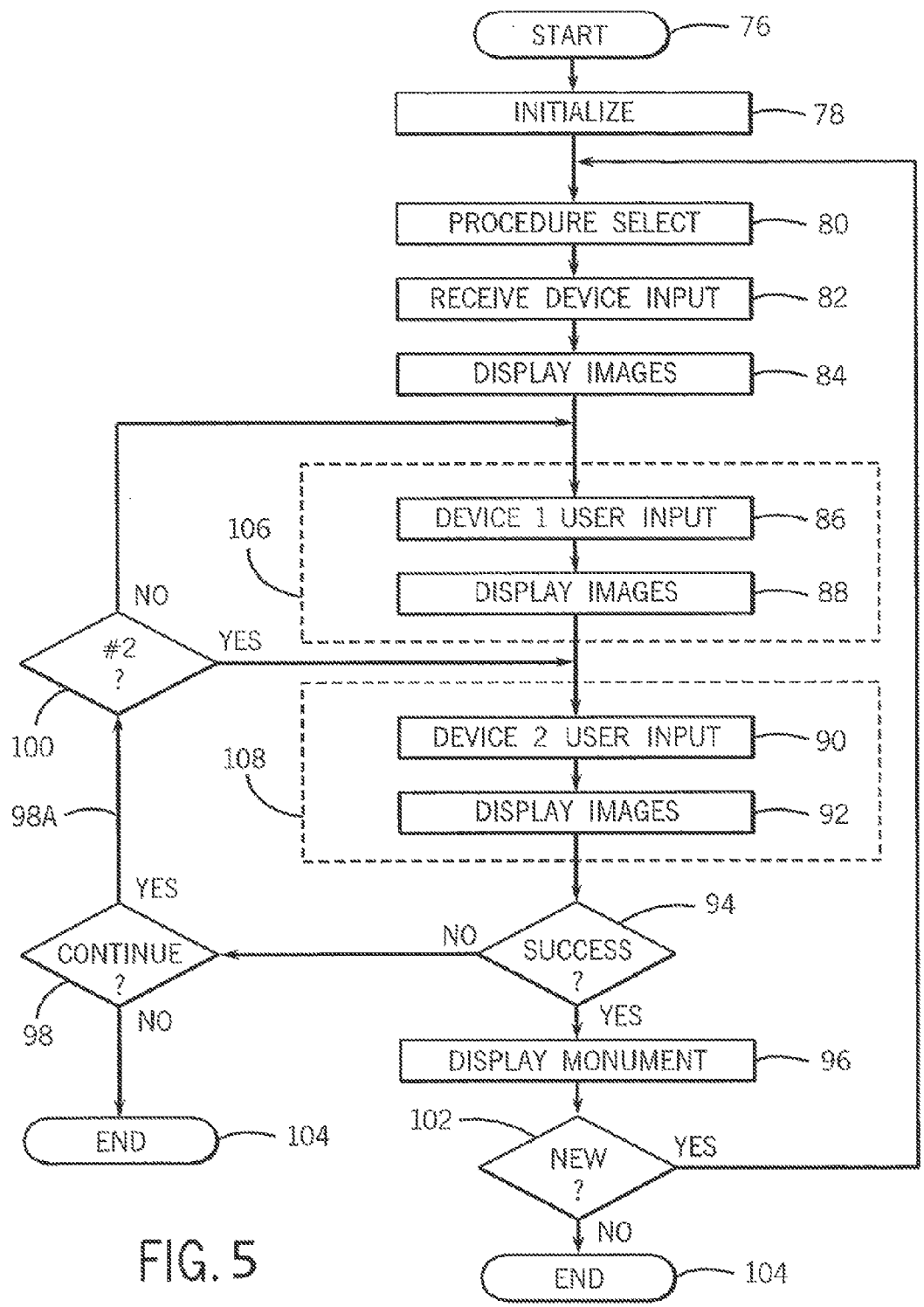
FIG. 5 is flow chart showing exemplary steps of operation that could be performed by the medical procedure training system of FIG. 4.

Operation of a dual interface system 110 is shown broadly in FIG. 5. After operation of the system 110 starts at step 76 the system 110 initializes at step 78 itself, or in the case of a PC an operating system (not shown) performs a booting procedure and identifies any connected I/O devices. A user will select at step 80 a medical training procedure and the system 110 will access the program saved in memory 20 or located on a peripheral memory media (not shown), which can include a database accessible via the worldwide web. Input from the peripheral devices 66, 68, 70, 72, 74 is received at step 82 and images are displayed at step 84 by the interlaces 66, 68.

The user provides input at step 86 for the first device 72 and corresponding images are displayed at step 88 by the first interface 66. Likewise, the user provides input at step 90 for the second device 74 and corresponding images are displayed at step 92 by the second interface 68. In the event that the user achieves success at step 94 a monument can be displayed at step 96. For example, a simulated syringe will change to a red color indicating flow of blood into a syringe reservoir and successful cannulation of the vein. A variety of monuments are conceivable, corresponding to and dependent upon the simulated device 74. In the event that success has not been achieved the user will decide whether to continue at step 98. If continued, the user must decide whether to continue at step 100 using the first device, the second device, or both. It is conceived that the user input at steps 86 and 90 need not be in any particular order, and in fact can be part of a loop 98A. The user can decide to start a new procedure at step 102 after achieving success at step 94. The new procedure at step 102 can also be the same procedure simulated an additional time in order to obtain mastery of the procedure.

Figure 5A:
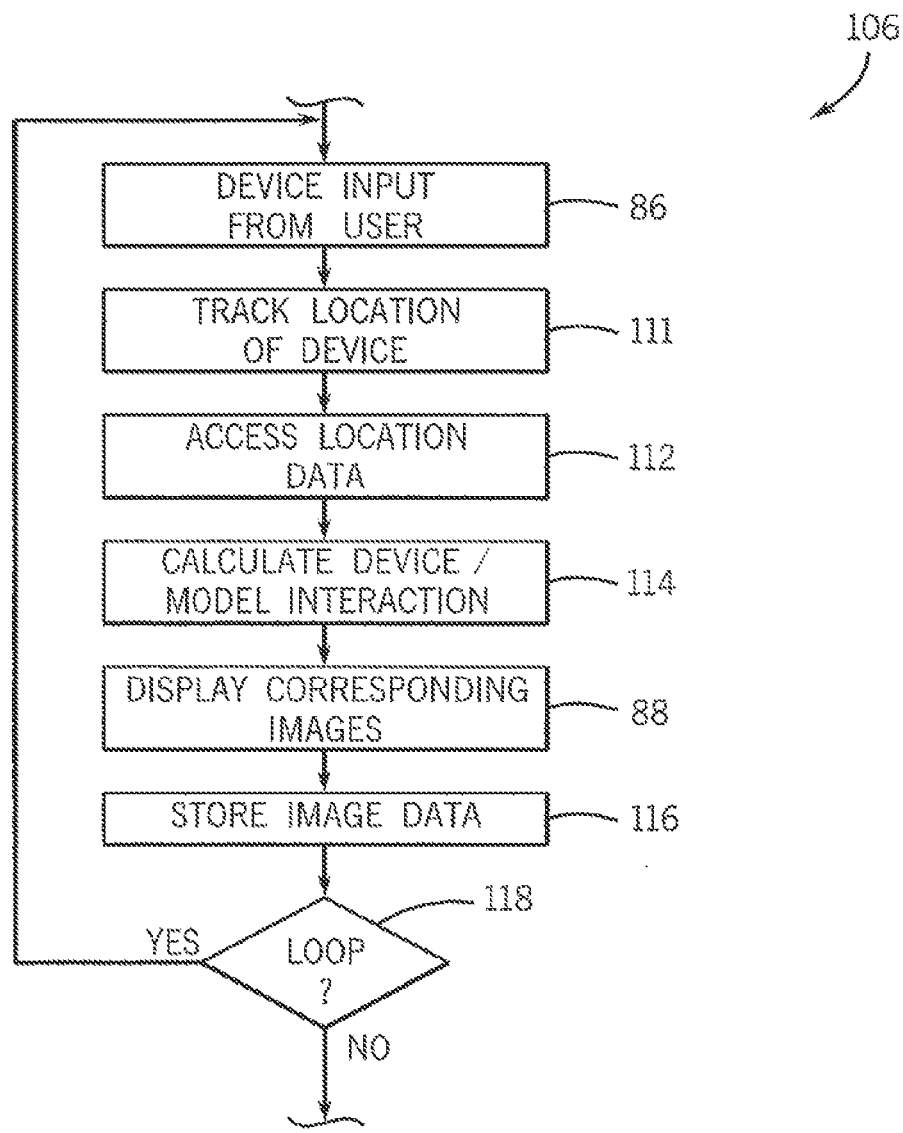
FIGS. 5A and 5B are additional flow charts showing further exemplary steps of operation that could be performed by first and second devices of the medical procedure training system of FIG. 4, respectively.
Figure 5B:
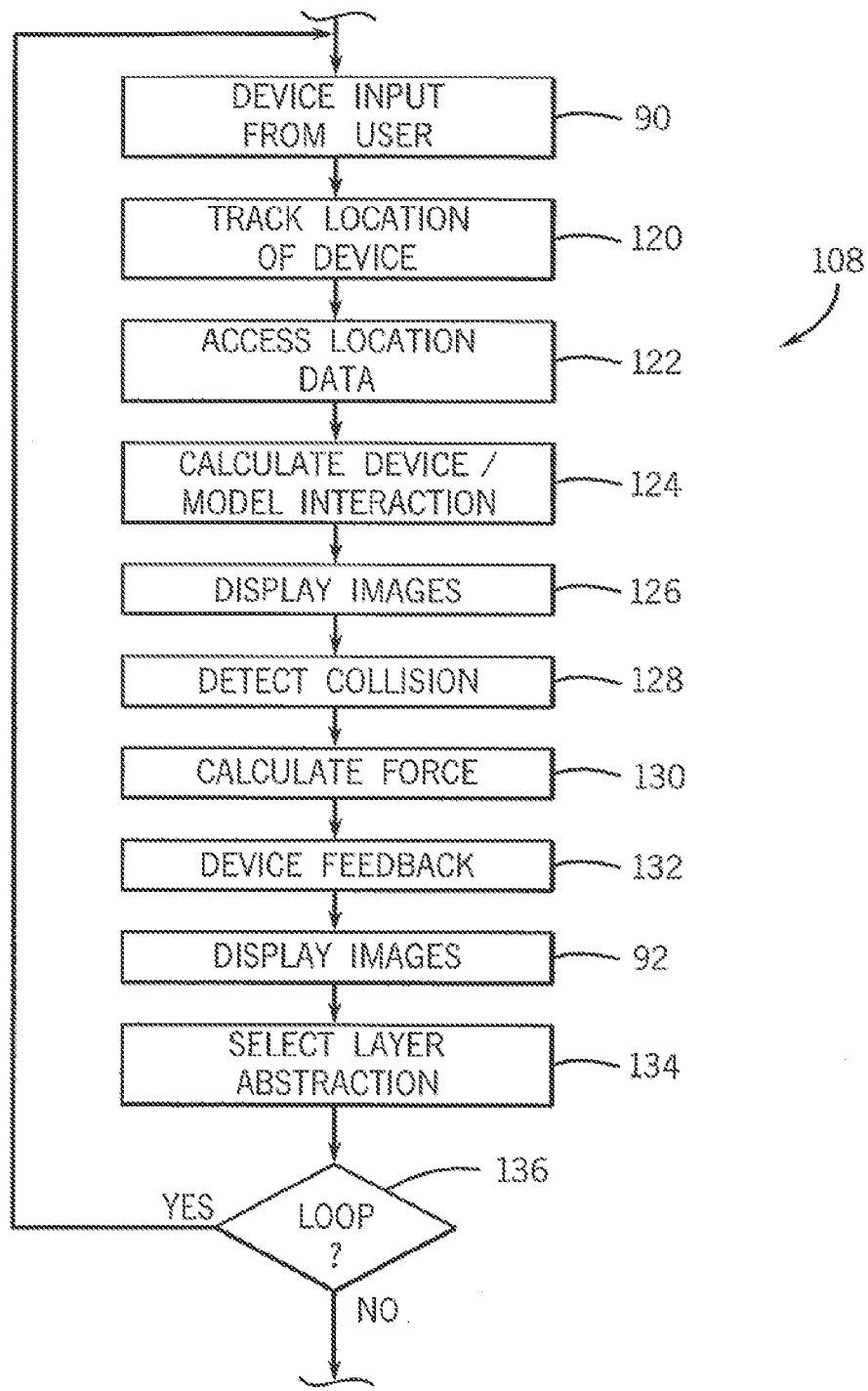

Operation of the system 110 is broadly shown in greater detail within FIGS. 5A and 5B, which correspond to operation section 106 (See FIG. 5A) and operation section 108 (See FIG. 5B).

Now referring to FIG. 5A, after the user provides input at step 86 to the first device 72 the device location is tracked at step 111 by the system 110. Device location data is accessed at step 112 and the device/three-dimensional model interaction is calculated at step 114. The corresponding images are then displayed at step 88, which provides visual feedback to the user. After the system 10 saves the image data at step 116 in memory 20, the user can loop back through use of the first device 72 or progress to using at step 90 the second device 74.

Now referring to FIG. 5B, after the user provides input at step 90 to the second device 74 the device location is tracked at step 120. Location data corresponding to the second device 74 is accessed at step 122 from memory 20 and the device/three-dimensional model interaction is calculated at step 124. The device 74 is displayed at step 126 in relation to the three-dimensional model. In the event that a collision occurs between the simulated device and the three-dimensional model, detection of the type of collision will be recorded at step 128 and saved in memory 20. A force calculation at step 130 will be communicated with the device 74 and a output at step 132 will be exerted by the device 74. Corresponding images will be displayed at step 92. At any point the user can select at step 134 a three-dimensional layer abstraction, which provides a viewpoint of the three-dimensional model based upon the needs of the user. The user can then continue to interact at step 136 with the device 74.

By way of example, a user can perform a simulated ultrasound-guided subclavian CVL placement using a simulated needle. The user would preferably begin by initializing the system and then plug the simulated ultrasound device into the computer 14 and navigate with a non-dominant hand. A simulated needle device 74n provides a force-feedback mechanism when navigating through the virtual environment. The user then engages the simulated needle 74 after connecting it to the computer 14. The user provides input to the device 74 through navigation, and the device 74 provides feedback through resistance to movement of the device 74. The resistance occurs after the simulated device, as depicted by the graphical interface 68, collides with the three-dimensional anatomical model 30. Resistance can be provided for a full range of motion or a partial range of motion, such as merely forward and lateral movement resistance. The user continues to engage both devices while observing the virtual positioning and interaction of the simulated devices as displayed by the interfaces 66, 68.

The coordinated movement of the devices 72, 74 and observation of the interaction allows the user to manipulate the virtual environment and obtain force feedback as the virtual structures are traversed. For example, the virtual structures can include simulated tissue, bone, and blood vessels. The user can learn complex procedures through interacting with the computer 14 based graphical display of a three-dimensional model 30. The system 10 conceivably can provide a means for manipulating the three-dimensional model whereby anatomical layers can be removed. Removal of various anatomical layers, such as the skeletal system or skin, can provide the user with a graphical means for conceptualizing the anatomy during navigation. Devices 72, 74 are distinguished for clarification purposes, as it is conceived that either one or both may be forcefeedback devices. It is further conceived that an alternative embodiment can have greater than two devices.

In one embodiment of the invention, a desktop VR system has a graphical interface 12 that provides multiple modal teaching to the user. The user can choose one or more teaching modalities when working through the virtual environment displayed by the graphical interface 12. In this particular embodiment the user has an anatomical model, recorded ultrasound imagery corresponding to the anatomical model, an interactive three-dimensional modeling display, and textual and two-dimensional textbook style resources. The view of the three-dimensional model can be altered based upon a multitude of designed viewpoints 34c. The viewpoints 34c can have a variety of views that include any combination of the skeletal system, musculature system, venous and arterial systems, internal organ systems, nervous systems. The user can select to remove various systems from the default viewpoint, which is a three-dimensional model of the entire anatomy.

In an alternative embodiment the ability to pre-select a variety of abnormalities or age specific scenarios that alter the appearance of the three-dimensional modeling is provided. The user can learn not only from a healthy and normal anatomical example, but also from diseased anatomical examples. Many real-life diseased examples are not available for each user to view, understand, and obtain experience. The system provides this opportunity to the user, virtually anytime or anywhere. Even better than real-life, the virtual example allows for endless perturbation and experimentation, which is not possible on a real-life example.

As the user progresses through a training scenario (See FIG. 5) it can be desirable for the user to see beyond the muscle system surrounding a particular target of the 3-D anatomical model. The user can select a tab 34c on the interface 12 (See FIG. 2), which removes the muscle layer and provides a three-dimensional model of the anatomy absent the muscle system. This is a clear advantage for training and educational purposes, as it allows the user to actually see what could only be conceptualized or integrated from multiple two-dimensional views.

The user engages the device 18, 74 through direct tactile interaction or with an intermediary, such as a latex glove, between the device and user. After engaging the device 18, 74 the user moves the stylus in a manner consistent with a medical device for which it is simulating. The user can visually identify the movement of the simulated device displayed by the graphical interface 66, 68. As the user moves the stylus closer to the displayed three-dimensional image a collision will occur and the device 74 will provide feedback in the form of resistance to further movement. The feedback resistance force will be predetermined and based upon the type of collision. Collision types include bone, skin, muscle, liquids, connective tissue, and cartilage. A collision with bone will cause a significant feedback force, whereas liquids will provide a minimal feedback force. The force calculation is also dependent upon the simulated device. A needle and syringe will have a much less feedback force when colliding with simulated skin then a pair of surgical scissors.

The system 110 has a haptic feedback device 74 used to determine the position and orientation of a simulated syringe and to simulate dynamic forces to be applied to a user's hand through the same haptic device. An exemplary haptic feedback device is a Phantom Omni commercially produced by SensAble Technologies, Inc. based in Woburn, Mass. Device 72 has a motion sensor integrated within the device housing. An exemplary motion sensor is an IS 300 Cube orientation sensor manufactured by Intersense based in Bedford, Mass. The motion sensor is used to determine the orientation of the simulated ultrasound probe held in the user's alternate hand. The probe orientation sensor is combined with model-based pre-defined procedure points to simulate the full position and orientation of the probe. The external sensors and devices are integrated with virtual devices, models and imagery stored within a virtual reality navigation (VR-NAV) based software simulation environment. The simulated environment contains the anatomic model, a model of the syringe, and a database of ultrasound images. The position and orientation of the ultrasound probe 72 is used to select stored ultrasound images, enabling the system 110 to display ultrasound images matched to the probe 72 position and pointing direction.

The position and orientation of the device 74 was used to locate the virtual syringe with respect to the virtual anatomical model. Collision detection algorithms associated with VR-NAV are used to determine when contact is made between the simulated syringe and needle and various parts of the anatomical model. Needle contact, penetration through or against the relevant anatomical materials (skin, vessels, bone, etc.) is determined. Results of the collision detection process are used to display the dynamic model of the threes involved. A dynamic force model is implemented that drives the desired forces, which can include rotational, torque, and translation forces along orthogonal axis. The dynamic model of the simulated syringe was reduced to a linear spring, a friction force and a positional constraint force that limited motion after needle insertion based on pivot points near the simulated skin surface. These forces were further constrained by parameters based on the material characteristics of the devices (e.g., needle, etc.) and anatomic features (e.g., skin, vessels, bone, etc.). Alternatively, the device 74 can be programmed for complete dynamic force-feedback simulation.

Force-feedback device are commercially available and come in the form of gloves, pens, joysticks, exoskeletons, ultrasound probes, scalpels, syringes and shaped like various other medical instruments. In medical applications, it is important that haptic devices convey the entire spectrum of textures from rigid to elastic to fluid materials. It is also essential that force feedback occur in real time to convey a sense of realism.

The system 10, 110 incorporates position sensing with six degrees of freedom and force feedback with three degrees of freedom. A stylus with a range of motion that approximates the lower arm pivoting at the user's wrist enables users to feel the point of the stylus in all axes and to track its orientation, including pitch, roll, and yaw movement.

In the present embodiment, the digital video 28 is prerecorded ultrasound video obtained from a living sample. The ultrasound video 28 is recorded along with orientation data of the ultrasound probe used obtaining the date. The orientation data is saved and indexed in a relational database (not shown), such that the data can be used to project digital ultrasound imagery through the graphical interface 12 based upon the position of the simulated ultrasound device connected to the system. The digital video section of the system allows users to perform virtual ultrasound examination by scanning a human-like three-dimensional model, accessing stored volumes of real patient ultrasound data. The virtual ultrasound probe is tracked and displayed in relation to the three-dimensional model. The probe's exact position, angle and movement in relation to the area of examination as displayed on the three-dimensional model are tracked. As the probe moves across the virtual model, the displayed digital video responds accordingly, providing real time, authentic scanning experience. The virtual probe position can be pre-selected for a particular view point. The viewpoint selected will provide video from real ultrasound previously recorded on a living human. Areas of interest for the viewpoint can include the abdominal, vascular, obstetric, and thoracic anatomical areas. The viewpoint selected is displayed on the anatomical display section. The present system has a finite number of starting positions for the probe. It is conceived that an alternative embodiment would not have a limit as to the starting positions and that as the probe transverses the model surface the digital video dynamically changes. The user can also have access to additional information regarding the simulated patient, which is based upon a living subject medical information. This medical report can be accessed though a linked tab 34a displayed on the interface. The report can contain personal and family history and lab results.

The ultrasound simulation device 72 may have the housing of a commercially available ultrasound device, or alternatively the device 72 may be molded to a desired shape and size, depending upon use and user, as ultrasound probes (not shown) vary in size and use. Mounted within the housing or mold of the device 72 is a motion sensor (not shown). Motion sensors are commercially available, one exemplary example is an IS 300 Cube orientation sensor manufactured by Intersense based in Bedford, Mass. The motion sensor is programmed with the system 110 such that as the device 72 moves, the sensor detects the movement and sends a signal to the system 110.

It is conceived that distinct data sets representing recordings from different human subjects based upon key abnormalities or medical afflictions are available to the user. The various data sets can be accessed and chosen prior to commencing the simulation. Alternatively, two or more ultrasound data sets can be displayed in the same screen for the educational purpose of comparing a normal subject to an abnormal, or an abnormal to an abnormal subject.

The system 10, 110 is not limited to any particular simulated medical procedure, but may include a variety of various simulations dependent upon the type and number of attached devices. By example, medical procedure that can be simulated by the system 10, 110 can include Anoscopy, central line placement, cricothyrodotomy, Anterior and Posterior Nasal packing, arterial cannulation, arterial blood gas, arthrocentesis, bladder catheterization, cardiac massage, cardiac massage, cardiac placing/cardioversion, contrast injection for imaging, endotracheal intubation, foreign body removal from cornea, fracture reduction, incision and drainage of abscess, intraosseous line placement, local anesthesia, lumbar puncture, nail trephination, needle thoracotomy, nerve blocks, nasogastric tube placement, percutaneous transtracheal ventilation, pericardiocentesis, peripheral intravenous line placement, thoracentesis, tube thoracotomy, and venous cutdown.

In an alternative embodiment, the system 110 can provide simulated multimodal medical training for bladder catheterization. A force-feedback device 74 simulates a urinary catheter and three-dimensional modeling of a bladder and surrounding anatomy is provided such that tactile recreation of the movements and feelings of bladder catheterization are achieved. The system 110 simulates the rotational movement of a urinary catheter traversing a virtual urethra and bladder. Movement of the simulated catheter can be tracked via ultrasound imagery provided through a simulated ultrasound probe 72. Corresponding anatomical images based on the simulated catheter orientation would be provided. The system 110 can provide needed training for insertion of the catheter, which is necessary for reasons that include restoring continuous urinary drainage to a patient.

In yet another alternative embodiment, the system 10 can provide simulated multimodal medical training for anoscopy, which is the examination of the anus and lower rectum. A force-feedback device 18 can be used to simulate an anoscope. A variety of haptic feedback devices can be used to simulate an anoscope, which in practice is a short, rigid, hollow tube that may also contain a light source. One exemplary device is the Phantom Premium Haptic Device commercially produced by SensAble Technologies, Inc. based in Woburn, Mass. The anoscope medical professionals to search for abnormal growths (i.e. tumors or polyps), inflammation, bleeding, and hemorrhoids. The device 18 is coupled with 3-D modeling of the rectosigmoid anatomy, thereby providing visual representation and virtual tactile recreation of the movements and feeling of performing an anoscopy. Movement of the anoscope can be tracked within interface section 30 and digital video can be displayed in section 28. The digital video displayed in section 28 can be actual images that are prerecorded from anoscopic procedures performed on living individuals. The video can display a variety of abnormalities or normal conditions based upon specific criteria, such as age, gender, or genetic mapping. The device 18 would augment verisimilitude by imparting a proportionate degree of resistance to virtual anoscopy probe passage.

Another alternative embodiment can provide a simulated multimodal medical training system 10 for cardiac massage. The cardiac massage can be internal or external and can be selected by the user prior to or during the simulation. A haptic glove device 18 can be used for the cardiac massage procedure. An exemplary haptic glove device is the CyberGlove™ manufactured by Immersion Corporation headquartered in San Jose, Calif. The CyberGlove™ can be used as part of the system 10 to train medical professionals on how to manually induce a heart to pump blood to the other parts of the body until cardiac activity can be restored. Coupled with the force-feedback glove 18 is a 3-D model of the thoracic anatomy to provide a visual representation and tactile recreation of the movements and feeling of performing cardiac massage. Prerecorded video of an actual heart undergoing cardiac massage can also be displayed by the graphical interface 12.

In an alternative embodiment, the system 10 can provide a multimodal medical training system for endotracheal intubation. A haptic force-feedback device 18 can be programmed with the system 10 to simulate a endotracheal tube and another device 16 can simulate a laryngoscope. Digital video can be displayed by the graphical interface 12 of recorded imagery of an actual laryngoscope in relation to a living individual. Imagery can be altered based upon the placement of the device 16. Device 18 is a haptic force-feedback device that simulates an endotracheal tube. The devices 16, 18 are coupled with a 3-D model of the airway anatomy to provide visual representation and tactile recreation of the movements and feelings of performing endotracheal intubation. The device 18 augments verisimilitude by imparting a proportionate degree of resistance to virtual endotracheal tube movement through the lower and upper airways.

Each of the alternative embodiments represent a different medical procedure that can be programmed into the system 10, 110 in conjunction with devices 16, 18, 72, 74. It is contemplated that the system 10, 110 can be programmed with all of the described medical procedures. Furthermore, the procedures that are described are meant to provide merely a sampling of the different procedures that can be simulated by the system 10, 110. Various force-feedback and input/output devices can be contemplated in combination with the system 10, 110. A typical computer mouse, keyboard, microphone, or a variety of other I/O devices can be used in conjunction with the system 10, 110. It is further contemplated that each embodiment provides hyperlinks to online data or data saved on the computer's memory 20 that is traditional textbook style learning materials. Audio learning materials can also be included with the system 10, 110.

It is specifically intended that the present invention not be limited to the embodiments and illustrations contained herein, but include modified forms of those embodiments including portions of the embodiments and combinations of elements of different embodiments as come within the scope of the following claims. Accordingly, while the present invention has been described with regards to particular embodiments, it is recognized that additional variations of the present invention may be devised without departing from the inventive concept.

INDUSTRIAL APPLICABILITY

This invention may be industrially applied to the development, manufacture, and use of medical training systems.

What is claimed is:
1. A medical procedure training system for simulating ultrasound, imaging and ultrasound-guided medical procedures, the system comprising:
 a control device;
 a graphical interface connected to the control device providing a plurality of interface sections, wherein a first interface section displays a digital video and a second interface section displays a virtual anatomical model and a three-dimensional ultrasound probe model, wherein the digital video comprises actual images previously recorded by scanning a live subject as well as simulated images, the actual images including a depiction of a muscle layer, the simulated images being modified actual images, the simulated images removing the depiction of the muscle layer from the actual images, where the actual images and simulated images are correlated to a position of the three-dimensional ultrasound probe model relative to the virtual anatomical model; and
 a user input device connected to the control device, the user input device comprising a motion sensor, the motion sensor detecting a position of the input device and a pointing direction of the input device, wherein, the graphical interface displays dynamic actual and simulated images corresponding to signals provided by the user input device, the signals corresponding to a spatial orientation, of the three-dimensional ultrasound probe model in relation to an area of examination of the virtual anatomical model, as determined from the position of the input device and the pointing direction of the input device, and wherein the system is configured to simulate ultrasound imaging and ultrasound-guided medical procedures through system feedback.

2. The system according to claim 1, wherein the plurality of interface sections include a digital video section, an anatomical section, an interactive three-dimensional model section and a real-patient-based case library comprising volumes of anatomical patient data.

3. A medical procedure training system for simulating ultrasound imaging and ultrasound-guided medical procedures, the system comprising:
  a control device;
  two graphical interfaces connected to the control device, wherein a first graphical interface displays a three-dimensional model and a second graphical interface displays a digital video, the digital video comprising actual images previously recorded by scanning a live subject as well as simulated images, the actual images including a depiction of a muscle layer, the simulated images being modified actual images, the simulated images removing the depiction of the muscle layer from the actual images; and
  a user input device connected to the control device, the user input device comprising a motion sensor, the motion sensor detecting a position of the input device and a pointing direction of the input device,
  wherein the graphical interface displays dynamic actual and simulated images corresponding to signals provided by the user input device, the signals corresponding to a spatial orientation of the user input device as determined from a position of the input device and a pointing direction of the input device, and
  wherein the system is configured to simulate ultrasound imaging and ultrasound-guided medical procedures through system feedback.

4. The system according to claim 1, further comprising a mechanical tracking device connected to the control device, wherein the mechanical tracking device simulates a medical tool.

5. The medical procedure training system according to claim 2, wherein the anatomical section comprises data created from a CT scan.

6. The medical procedure training system according to claim 2, wherein the anatomical section comprises data created from an MRI scan.

7. The medical procedure training system according to claim 2, wherein the anatomical section comprises data created from ultrasound images.

8. The medical procedure training system according to claim 1, wherein the control device is a computer.

9. The system according to claim 1, wherein the three-dimensional model has user selectable views, wherein a user may virtually remove a portion of the three-dimensional anatomical model from the graphical interface thereby allowing a different three-dimensional view.

10. The system according to claim 1, further comprising a memory storage device having a library of medical data linked to simulated medical procedures, wherein a user may access the library during a training procedure.

11. The system according to claim 1, further comprising a memory storage device, wherein user performance data is stored in the memory storage device.

12. The system according to claim 1, wherein the system further comprises a second user input device that simulates a combination needle and syringe.

13. The system according to claim 12, wherein the plurality of interface sections includes a digital video section corresponding to an orientation of the second user input device, an interactive three-dimensional model section corresponding to the second user input device in relation to an anatomical model, and a library access section for accessing data stored in a memory storage device.

14. The system according to claim 13, wherein the library access section contains data accessed from an online source.

15. The system according to claim 13, wherein the library access section contains medical data.

16. The system according to claim 12, wherein the control device is a laptop PC.

17. A method of operating a multimodal medical training system, comprising the steps of:
  selecting a first simulated medical procedure from a library;
  displaying images on a graphical interface, the images corresponding to the simulated medical procedure;
  receiving a first input from a first user input device, wherein the first user input device is a motion sensor, the motion sensor detecting a position of the input device and a pointing direction of the input device;
  processing the first input in relation to the simulated medical procedure;
  displaying images corresponding to the first user input device, the first user input device images comprising actual images previously recorded by scanning a live subject as well as simulated images, the actual images including a depiction of a tissue layer, the simulated images being modified actual images, the simulated images removing the depiction of the tissue layer from the actual images, where the actual images and simulated images correspond to the position of the input device and the pointing direction of the input device;
  receiving a second input from a second user input device, wherein the second user input device is a force-feedback device simulating a medical tool;
  processing the second input in relation to the simulated medical procedure;
  modifying and displaying images corresponding to the second user input device;
  providing force-feedback signals to the second user input device;
  receiving input from the second user input device based upon the force-feedback signals; and
  determining whether the simulated medical procedure reached a desired end point.

18. The method according to claim 17, wherein the images displayed by the graphical interface include a digital video section comprising real-patient anatomical data, an anatomical section, and an interactive three-dimensional model section.

19. The method according to claim 17, wherein the simulated medical procedure is selected from the group consisting of anoscopy, central line placement, cricothyrodotomy cricothyroidotomy, anterior and posterior nasal packing, arterial cannulation, arterial blood gas, arthrocentesis, bladder catheterization, cardiac massage, cardiac placing/cardioversion, endotracheal intubation, foreign body removal from cornea, fracture reduction, incision and drainage of abscess, intraosseous line placement, local anesthesia, lumbar puncture, nail trephination, needle thorascotomy, nerve blocks, nasogastric tube placement, percutaneous transtracheal ventilation, pericardiocentesis, peripheral intravenous line placement, thoracentesis, tube thoracostomy, and venous cutdown.

* * * * *

UNITED STATES PATENT AND TRADEMARK OFFICE
CERTIFICATE OF CORRECTION

PATENT NO. : 8,480,404 B2
APPLICATION NO. : 13/243758
DATED : July 9, 2013
INVENTOR(S) : Eric A. Savitsky Page 1 of 1

It is certified that error appears in the above-identified patent and that said Letters Patent is hereby corrected as shown below:

On the Title Page,
Item (73) The Assignee section, Should read:

Assignee: The Regents of the University of California, Oakland, CA (US)

Signed and Sealed this
Twenty-second Day of October, 2013

Teresa Stanek Rea
*Deputy Director of the United States Patent and Trademark Office*